United States Patent
Ivanov

(10) Patent No.: US 11,143,556 B1
(45) Date of Patent: Oct. 12, 2021

(54) BIREFRINGENT INTERFEROMETER AND FOURIER TRANSFORM SPECTROMETER

(71) Applicant: Evgueni Vladimirovich Ivanov, Lexington, MA (US)

(72) Inventor: Evgueni Vladimirovich Ivanov, Lexington, MA (US)

( * ) Notice: Subject to any disclaimer, the term of this patent is extended or adjusted under 35 U.S.C. 154(b) by 0 days.

(21) Appl. No.: 16/894,816

(22) Filed: Jun. 7, 2020

(51) Int. Cl.
*G01J 3/45* (2006.01)
*G01J 3/02* (2006.01)
*G01J 3/28* (2006.01)

(52) U.S. Cl.
CPC .............. *G01J 3/45* (2013.01); *G01J 3/021* (2013.01); *G01J 3/0224* (2013.01); *G01J 3/2803* (2013.01); *G01J 2003/2813* (2013.01)

(58) Field of Classification Search
None
See application file for complete search history.

(56) References Cited

U.S. PATENT DOCUMENTS

| | | | | | |
|---|---|---|---|---|---|
| 3,849,001 | A | * | 11/1974 | Inoue | G01J 3/4537 356/327 |
| 5,013,153 | A | * | 5/1991 | Disch | G01J 3/12 356/453 |
| 5,191,392 | A | * | 3/1993 | Johnson | G01S 3/782 356/365 |
| 5,696,586 | A | * | 12/1997 | Ivanov | G01N 21/3518 356/364 |
| 5,883,713 | A | * | 3/1999 | Davis | G01J 3/4537 356/455 |
| 6,222,632 | B1 | * | 4/2001 | Bakin | G01J 3/453 356/453 |
| 6,421,131 | B1 | * | 7/2002 | Miller | G01J 3/447 356/453 |
| 2012/0113423 | A1 | * | 5/2012 | Groswasser | G01N 21/1717 356/367 |
| 2017/0010159 | A1 | * | 1/2017 | Jin | G01J 3/2823 |

FOREIGN PATENT DOCUMENTS

EP     1482287 A1 * 12/2004 ............... G01J 3/45

* cited by examiner

*Primary Examiner* — Shawn Decenzo

(57) ABSTRACT

Embodiments of the present invention provide systems and methods for compact birefringent interferometer and Fourier Transform spectrometer which uses rotating birefringent crystal plate to produce variable optical path difference (OPD) between ordinary and extraordinary rays of the incident light travelling through the birefringent crystal plate. In one aspect, the system includes an optical birefringent interferometer and Fourier Transform spectrometer comprising a polarizing beamsplitter, a reflective mirror, a rotating and a fixed compensating birefringent plate. In another aspect, the interferometer and Fourier Transform spectrometer may further include a photodetector in order to obtain a spectrum of the incoming radiation. In yet another aspect, the interferometer and Fourier Transform spectrometer may further include a one-dimensional or two-dimensional photodetector array or in order to obtain a hyperspectral image of the radiation source or illuminated object.

19 Claims, 10 Drawing Sheets

BIREFRINGENT INTERFEROMETER AND FOURIER TRANSFORM SPECTROMETER

BACKGROUND OF THE INVENTION

The present invention relates to the field of optical interferometers and Fourier Transform spectrometers, in particular to interferometers and Fourier Transform spectrometers utilizing birefringent polarization interferometers with mechanically controlled optical path difference.

Spectroscopy is a commonly used analytical technique for chemical analysis and detection as well as for many other applications. Spectrometers are devices that analyze intensities and other characteristics of received optical signals as a function of wavelength or frequency in order to characterize matter. During a spectroscopic measurement, light is incident on a sample (where a sample may be a certain substance, material, or a region in space) and interacts with various atoms and molecules in the sample (e.g. is reflected or scattered from the sample, transmitted through the sample, partially absorbed by the sample, etc.). At least some of the light that has interacted with the sample eventually reaches a photodetector of the spectrometer, which may include one or more photosensitive elements. By measuring intensity of the received light as a function of a wavelength or frequency, the spectrometer can detect and quantify presence of various atoms and molecules in the sample.

There is a large variety of the optical arrangements of spectrometers. Fourier Transform spectrometers are widely used, particularly in the infrared spectral range, due to their well-known optical throughput, or Jaquinot, advantage, and multiplex, or Fellgett, advantage. The former offers a larger optical throughput (product of the input aperture and radiation acceptance field of view angle), compared with traditional diffraction grating spectrometers; the latter arises from the fact that all wavelengths are analyzed simultaneously while using a single detector at the output of the device. Both of these advantages lead to substantially higher signal to noise ratio compared to scanning diffraction grating spectrometers. The multichannel diffraction grating spectrometers also analyze all wavelengths simultaneously and benefit in the multiplex advantage, however, this is achieved by the expense of using detector arrays. In the visible and near-infrared spectral range from 0.3 to 1.1 µm inexpensive Silicon photodetector arrays (PDA) or CMOS silicon image sensors can be used for multichannel diffraction grating spectrometers. In the short-wave infrared spectral range from 1.1 to 2.5 µm more expensive PDAs such as InGaAs PDAs are typically used. In the mid-infrared region from 3-20 µm the detector arrays are very expensive and typically have inferior performance in comparison with single-element detectors. For this reason Fourier Transform spectrometers dominate the spectrometers market in the mid-infrared region and co-exist with multichannel diffraction grating spectrometers in the near- and short-wave infrared regions.

Scanning Fourier Transform spectrometers are based on scanning interferometers that divide the incident light into two beams, introduce a certain variable in time optical path difference (OPD) between the beams and then recombine the beams resulting in constructive or destructive interference of the combined beams depending on the value of the OPD. The intensity pattern in time domain measured by a photodetector at the output of the interferometer and resulting from such interference is termed an interferogram. The spectrum of the incident radiation in the wavelength domain can be retrieved by applying Fourier Transform to the measured time-domain interferogram signal.

There is a variety of optical arrangements used to construct interferometers for Fourier Transform spectrometers. Traditional arrangements include a variety of split-path interferometers such as Michelson, Mach-Zender, Twyman-Greene, and Signac interferometers among others, where the incoming light is spatially split into two different beams travelling along two spatially separated paths and where the optical path length of one of the beams is varied by mechanical means. These arrangements provide high performance and resolution. However, the said split-path interferometers are typically built with high precision (down to λ/50) optical and mechanical components leading to high cost and large size. Also, the mechanical arrangement is typically based on high-precision air bearings and voice coil which make the instrument to be sensitive to mechanical vibrations.

The difficulties of split-path interferometers of are overcome in birefringent interferometers. As illustrated in FIG. 1, a birefringent interferometer can be constructed using a birefringent crystal 108 placed between an input polarizer 102 and output polarizing analyzer 112. In the optical arrangement of birefringent interferometer the input beam is split into two beams with orthogonal polarizations that travel along the same path through a birefringent crystal medium that has different refraction indexes for the beams with different polarizations. This causes the two orthogonally polarized beams to achieve a certain optical path difference (OPD) at the exit from the birefringent plate. These two beams are combined at the analyzing polarizer 112 after exiting the birefringent plate that leads to interference between the two said beams. The OPD can be varied by varying the effective thickness of the birefringent plate or by varying the birefringence of the crystal medium.

There is a variety of arrangements of birefringent interferometers known in the prior art. Some arrangements use liquid crystals as birefringent medium. The benefit of using liquid crystals in interferometers is low cost and possibility to vary the effective birefringence of liquid crystals by means of applying relatively small electric voltage across the layer of liquid crystal. However, liquid crystal birefringent interferometers suffer from low optical path difference, slow response at large cell thicknesses and difficulties of precisely controlling the birefringence leading to low spectroscopic resolution.

Other arrangements use solid birefringent crystals with mechanically variable optical path difference. One of these arrangements known in the prior art comprise a birefringent crystal plate composed with a pair of crystal wedges with the effective thickness of the crystal mechanically adjustable by means of moving one of the wedges along its plane of the surface as described in U.S. Pat. No. 5,696,586. The said arrangement benefits from lower cost and less sensitivity to vibration compared to split-beam interferometers; however, the use of precision translation mechanical stage and a pair of birefringent crystal wedges still leads to relatively high the cost and size of the system.

Another possible arrangement uses a rotating birefringent plate 208 placed between two polarizers 202 and 212 as illustrated on FIG. 2. However, rotation of the birefringent plate causes a shift of the beam in the direction perpendicular to the beam propagation. In addition, the angle of the field of view of the interferometer with a single rotating plate is significantly reduced at higher angles of rotation which leads to significant loss of the optical throughput. In order to cancel the beam shift and the loss of the field of view angle, as illustrated on FIG. 4, a second birefringent plate 416 rotating in the opposite direction is included with the thickness equal to the thickness of the first rotating plate 408 and the optical axis 414 parallel to the optical axis 406 of the first rotating plate. The said system with two birefringent plates rotating in the opposite directions by means of precision mechanical rotation mechanisms and placed between two polarizers is described in European patent application EP1482287A1.

However, the range of the optical path difference in the interferometer used in a Fourier transform spectrometer must include the region around zero path difference. This requirement leads to the inclusion of an additional compensating birefringent plate 518 with optical axis 520 arranged perpendicular to the optical axis of the rotating plates and the thickness at least two times greater than the thickness of each rotating plate, as illustrated on FIG. 5.

The use of two precision mechanical rotating mechanisms for rotation of two plates in the opposite directions and the use of three birefringent plates and two polarizers increases the cost and size of the said birefringent interferometer system.

Therefore, while a variety of Fourier Transform spectrometers and birefringent interferometers have been taught by the prior art, they all have certain limitations that do not allow to achieve low system cost and size. While a variety of Fourier transform spectrometers have been described in the prior art and are commercially available, they are still higher-cost and larger-size instruments as compared to a variety of smaller size and lower cost compact spectrometers based on diffraction gratings with multichannel detector arrays.

SUMMARY OF THE INVENTION

The aim of the present invention is to provide lower cost and smaller size arrangement for high resolution and high optical throughput Fourier Transform spectroscopy. The interferometer and Fourier Transform spectrometer systems described herein may be used in any systems that require determination of presence and, possibly, the amount of a certain chemical component on or in a sample or in a media.

In one aspect, the system includes an optical birefringent interferometer and Fourier Transform spectrometer comprising two birefringent plates, one of which 606 is fixed and the other one 604 is rotated by means of precision mechanical mechanism, placed between a tilted polarizing beamsplitter 602 and a mirror 608 as illustrated on FIG. 6. The polarizing beamsplitter can be made of a separate polarizer plate and a separate beamsplitter plate placed at the angle with respect to the propagation direction of the incident beam. Alternatively, the polarizing beamsplitter can be made of a single optical element simultaneously performing the polarizing and beam-splitting functions such as a wire grid polarizer. The complete Fourier transform spectrometer system may further comprise a first photodetector 1010 placed at the output of the optical path of the beam in order to measure the intensity of light exiting the interferometer, and a mixed-signal processing unit 1022 for amplifying the photodetector signal and performing other necessary electronic control and measurements functions as illustrated on FIG. 10. The system may also further comprise a digital signal processing means 1020 such as a local computer, cellular phone or cloud computing system, in order to apply Fourier Transform and to retrieve the spectrum of the incident radiation.

Additionally, the system may comprise a second photodetector 712 for measuring the intensity of light reflected from the incident beam directly by the beamsplitter in order to cancel the intensity variations of the incident radiations by means of further signal processing as illustrated on FIG. 7.

Additionally, the system may include one or more monochromatic or narrow band light sources 816 to provide a reference signal in order to determine the OPD of the interferometer at each moment in time as illustrated on FIG. 8. The light from the said monochromatic light source can be passed along an optical path parallel to and separate from the optical path of the incident beam through the said interferometer and measured by a third photodetector 814.

Additionally, the system may comprise a forth photodetector 822 that is sensitive to a spectral region different from the spectral region of sensitivity of the first photodetector 824 and a beam-splitting high-pass, low-pass or band-pass filter 824 in order to enhance the spectral region of the spectrometer beyond the spectral region of sensitivity of the first photodetector as illustrated on FIG. 8.

Also, the system may comprise a one-dimensional or two-dimensional photodetector array 910 instead of a single photodetector in order to acquire a hyper-spectral image of the radiation source or an illuminated object as illustrated on FIG. 9.

Other features and advantages of the disclosure are apparent from the following description, from the examples, and from the claims. Specific details of several embodiments of the present invention are described below with reference to FIGS. 6-10. Other details associated with well-known structures, systems and techniques associated with polarization birefringent interferometers and Fourier Transform spectrometers have not been described in the following disclosure. Many of the details, dimensions, angles, and other features shown in the Figures and mentioned in the description are merely illustrative of particular embodiments of the invention. Accordingly, other embodiments within the scope of the claims can have other details, dimensions, angles, and features without departing from the scope of the present invention. A person of ordinary skill in the art, therefore, will accordingly understand that the technology may have other embodiments with additional elements, or may have other embodiments without several of the features shown and described below with the references to the FIGS. 6-10.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Basics of Birefringent Polarization Interferometers

Figure 1:
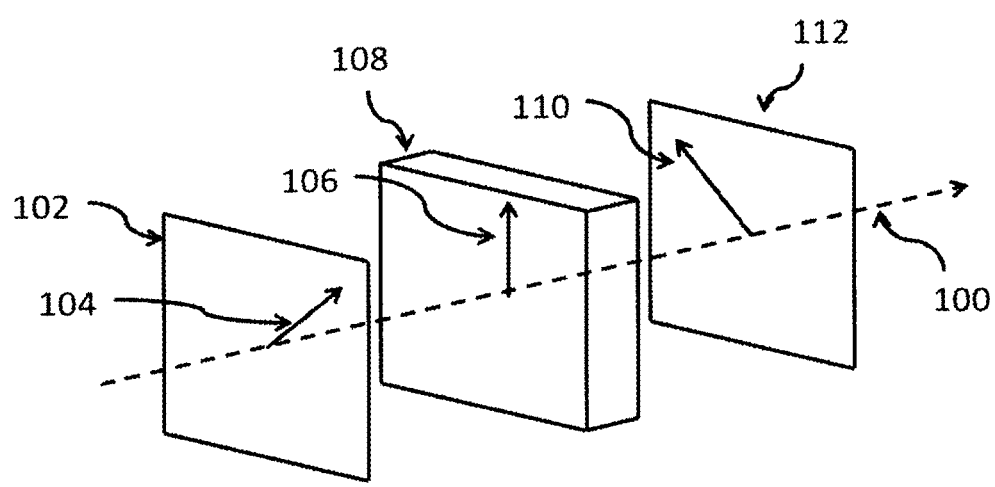
FIG. 1 illustrates a basic structure of a birefringent polarization interferometer with any type of birefringent crystal as known in the prior art.

A basic arrangement of a birefringent polarization interferometer known in the prior art is illustrated in FIG. 1 and can be constructed using a birefringent crystal 108 placed between the input polarizer 102 and output polarizing analyzer 112. If the optical axis 106 of the birefringent crystal 108 is arranged in the plane perpendicular to the direction of the light propagation 100 and at the angle of about 45 degrees with respect to the direction of polarization 104 of the input polarizer 102, the incident beam is equally divided into ordinary beam with polarization perpendicular to the optical axis of the crystal, and extraordinary beam with polarization parallel to the optical axis of the crystal. The polarization direction 110 of the output analyzer 112 is oriented perpendicular or parallel to the polarization direction 104 of the input polarizer 102. Due to a difference in the refractive indexes for ordinary and extraordinary rays caused by the crystal birefringence the said ordinary and extraordinary rays travel through the crystal at different speed which leads to a difference in effective optical paths through the crystal for the said ordinary and extraordinary rays:

$$OPD = L \cdot \Delta n,$$

where L is the path length of the light propagation through the crystal and $\Delta n = n_e - n_o$ is the difference between refractive indices for extraordinary and ordinary rays, and OPD is the optical path difference between ordinary and extraordinary rays. After passing through the output polarizing analyzer the ordinary and extraordinary rays are combined which leads to interference between them so that the resulting light intensity $I_{OUT}$ at the output of the analyzer is given by:

$$I_{out} = \frac{I_{IN}}{2} \cdot \cos\left(\frac{2\pi \cdot OPD}{\lambda}\right),$$

where $I_{IN}$ is the light intensity of the incident radiation and $\lambda$ is the wavelength of the incident radiation. If the incident radiation contains a multitude of wavelengths then the output intensity will be a superposition of interference intensities produced by each wavelength. By varying the OPD in the birefringent crystal over time by electrical or mechanical means and measuring the intensity of light at the output of the interferometer one can produce and interferogram $I_{OUT}(t)$ according to the above equation which is a periodic function over time with the period proportional to the wavelength. Therefore, by applying Fourier Transform to the measured interferogram one can retrieve the spectrum of the incident radiation in the wavelength domain.

However, the spectrum retrieval operation by means of Fourier transform can only be achieved if the range of the OPD values in the interferogram contains the region around the zero OPD. In order to achieve the zero OPD the birefringent interferometers typically comprise a compensating birefringent plate (such as the plate 518 on FIG. 5) with its optical axis perpendicular to the direction of propagation of the beam and perpendicular to the optical axis of the birefringent element with the varying OPD. By placing the said compensating plate the birefringence of the compensating plate is subtracted from the birefringence of the birefringent element with the varying OPD and zero OPD value can be achieved.

The spectral resolution of interferometer-based Fourier Transform spectrometer is inversely proportional to the maximum OPD in the interferometer:

$$\Delta \upsilon = 1/OPD_{MAX},$$

where $\Delta \upsilon$ is spectral resolution in wavenumbers.

Figure 3:
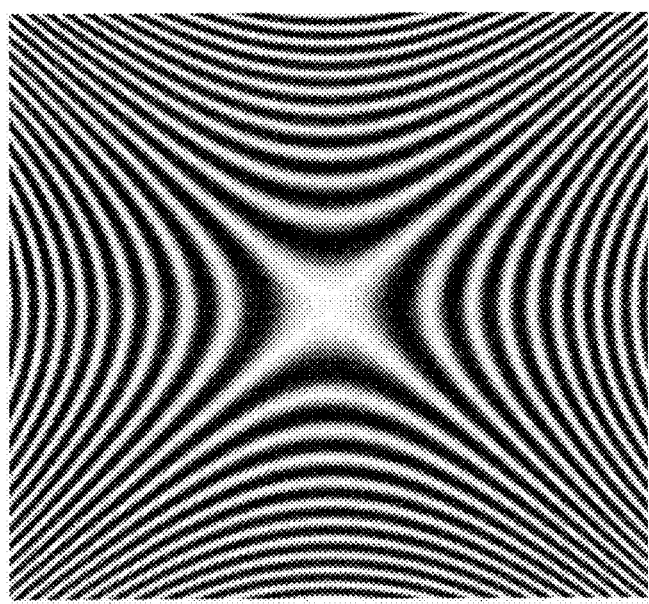
FIG. 3 illustrates a spatial interference pattern in the focal plane of an imaging objective placed at the output of the analyzer in the birefringent interferometer.

Another property of birefringent interferometers is their optical field of view (FOV). For the light beam traveling through a birefringent interferometer at a certain angle $\theta$ between the propagation direction and the direction orthogonal to the cell walls and at an angle $\omega$ between the optical axis of the crystal and the plane of light incidence the OPD becomes a function of the angles $\theta$ and $\omega$ according to the equation (B-18) given in "Polarization Interferometers" by M. Francon and S. Mallick, Wiley, 1971:

$$OPD(\theta, \omega) = L \frac{b-a}{2a}\left[1 + \frac{b \cdot \sin^2(\theta)}{2}(a \cdot \sin^2(\omega) - b \cdot \cos^2(\omega))\right],$$

where $a = 1/n_e$ and $b = 1/n_o$. The above dependence of the OPD produces an angle-dependent interference pattern shown on FIG. 3 that can be visualized on the screen placed in the focal plane of an imaging objective placed at the exit of the polarizing analyzer. If the incident light beam is a composition of beams travelling at different angles $\theta$ and $\omega$ so that their OPD differ by more than half wavelength, the intensity signals at the photodetector will cancel each other and amplitude of the interferogram will be significantly decreased leading to a loss of signal. Therefore, the field-of-view (FOV) of the birefringent interferometer is limited by approximately at most $$FOV <= \frac{2\lambda}{L} \frac{n_e n_0}{n_e - n_o}$$

Figure 2:
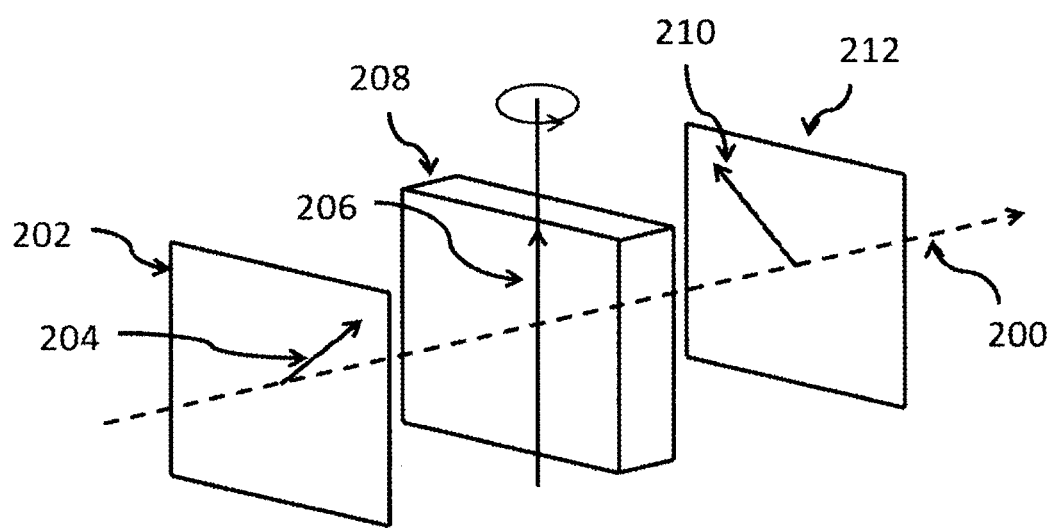
FIG. 2 illustrates a basic structure of birefringent polarization interferometer with a single rotating birefringent crystal plate as known in the prior art.

The maximum FOV for a given crystal thickness L is achieved when the average angle of the propagation direction of the incident beam with respect to the direction orthogonal to the crystal plate walls is equal to zero, which corresponds to the central region of the interferogram in FIG. 2 where the distance between the nearby fringes is the largest. If the birefringent plate is tilted or rotated, the angle of the propagation direction of the incident beam becomes greater than zero and therefore the distance between the interference fringes becomes significantly smaller and the effective FOV is significantly reduced leading to a corresponding reduction in the optical throughput.

Figure 4:
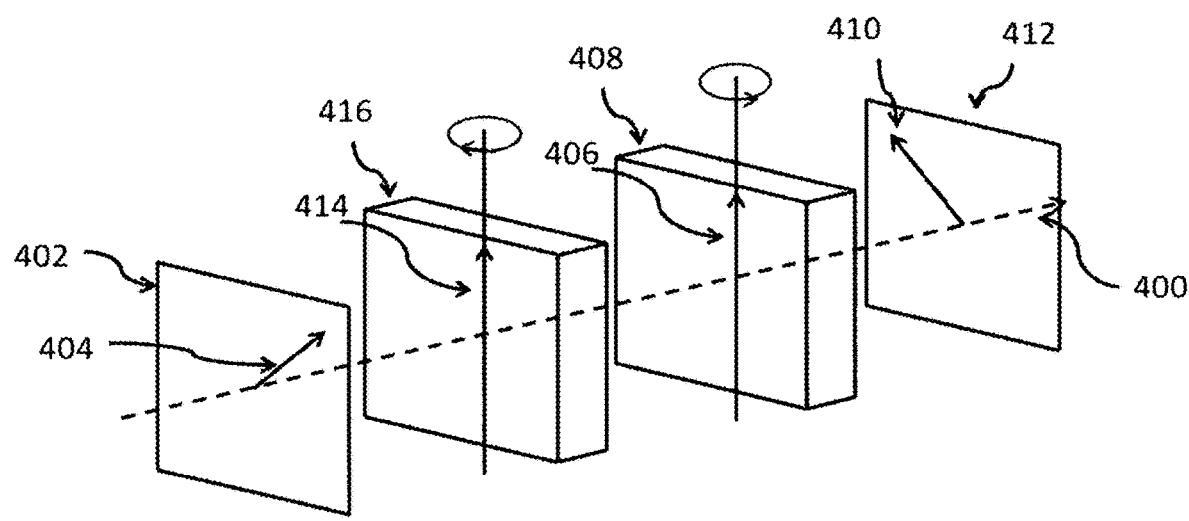
FIG. 4 illustrates a birefringent interferometer with two birefringent plates rotating in the opposite directions as known in the prior art.

In the birefringent interferometer arrangement of the prior art according to the European patent application EP1482287A1 as illustrated in FIG. 4 the variation of the OPD is achieved by rotating of two birefringent plates. In order to cancel the transversal beam shift and the loss of the FOV caused by such rotation of the first birefringent plate 408, a second birefringent plate 416 rotating in the opposite direction is included with the thickness equal to the thickness of the first rotating plate and the optical axis 414 parallel to the optical axis 406 of the first rotating plate. The arrangement further includes two polarizers 402 and 412 and a precision complex rotating mechanism to rotate two plates at the equal angle in the opposite directions. In order for such system to be used in a Fourier transform spectrometer, the range of the OPD variation has to include zero OPD and the interferometer has to further include at least one additional compensating birefringent plate 518 with optical axis perpendicular to the optical axis of the rotating plates and the thickness equal or greater than the total thickness of the two rotating plates, as illustrated on FIG. 5.

Description of Embodiments According to the Present Invention

The current invention discloses a multitude of arrangements allowing to fabricate simplified, lower cost and smaller size birefringent interferometers.

Figure 6:
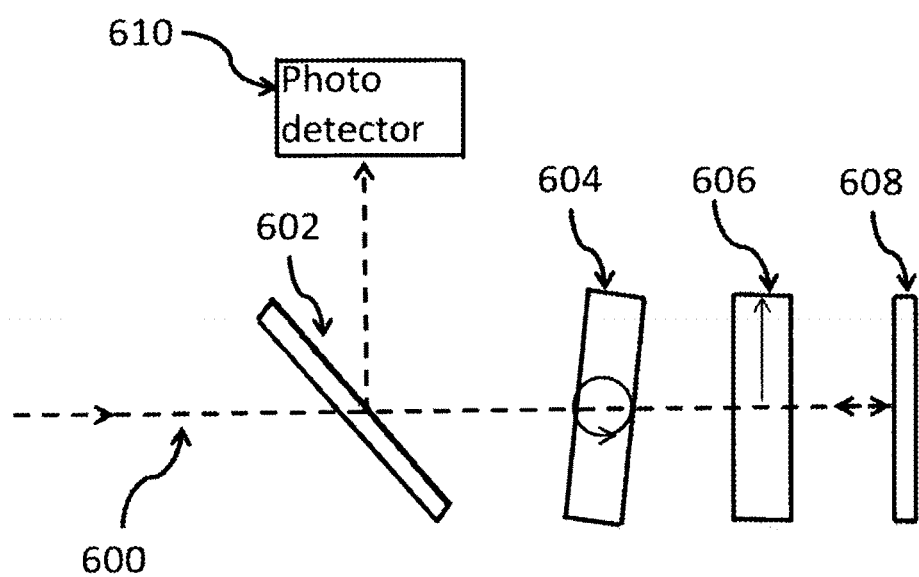
FIG. 6 illustrates a basic arrangement of birefringent interferometer with a single rotating birefringent plate, a single fixed birefringent plate, a mirror and a polarizing beamsplitter according to the present invention.

In some embodiments, as illustrated in FIG. 6, the system comprises a rotating birefringent crystal plate 604 and a fixed compensating birefringent crystal compensation plate 606 placed between a mirror 608 and a beamsplitting polarizer 602. The incoming radiation 600 is polarized by the beamsplitting polarizer 602 and travels through the rotating and the fixed birefringent crystals plates. It is consequently reflected back by the mirror 608 and travels back through the fixed and rotating plates. The action of the rotating plate on the axial shift of the beam and angular shift of the interference pattern of the reflected beam travelling backward is opposite to the similar action of the rotating plate on the beam travelling forward. Therefore, the axial shift of the beam and angular shift of the interference pattern acquired by the beam travelling through the rotating plate in the forward direction is cancelled by the opposite axial shift of the beam and opposite angular shift of the interference pattern caused by the beam travelling backwards through the same rotating plate. At the same time, the OPD acquired by the beam travelling forward through the rotating and fixed plate is added to the OPD acquired by the beam travelling backward through the same plates. Also, the OPD acquired by the beam travelling forward and backward through of the rotating 604 plate is opposite to the OPD acquired by the beam travelling forward and backward through of the compensating plate 606 which allows to reach a region of zero OPD. The beam travelling backwards is further reflected by the same beamsplitting polarizer 602 towards the photodetector 610 so that the same beamsplitting polarizer acts as an entrance polarizer and the exit analyzer in the said interferometer.

Figure 5:
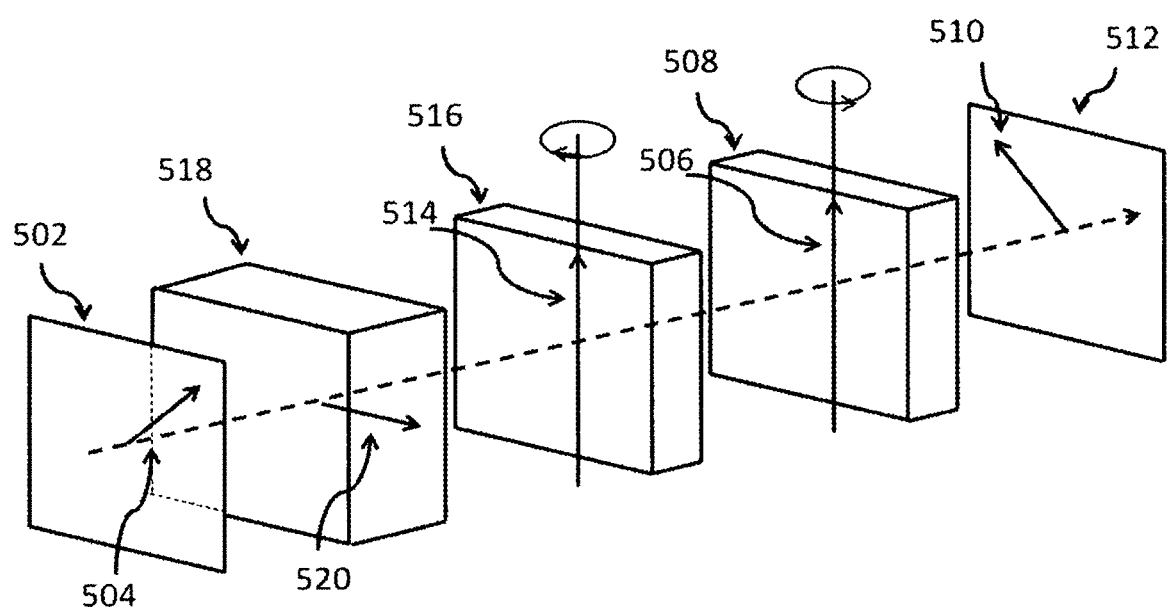
FIG. 5 illustrates a birefringent interferometer with two birefringent plates rotating in the opposite directions and a fixed compensating birefringent plate as known in the prior art.

It can be appreciated by anyone skilled in the art that the action and functionality of the said interferometer arrangement of the present invention is equivalent to the action and functionality of the interferometer arrangement of the prior art as shown on FIG. 5. However, the same action and functionality is achieved with only one precision rotating mechanism, one rotating plate and one beamsplititng polarizer thereby significantly reducing the system cost and size.

In the said embodiments the optical axes of the fixed and rotating crystal plates are preferably about perpendicular to each other and the polarization direction of the beamsplitting polarizer is arranged preferably at the angle of about 45 degrees. In other embodiments the said angles may have different values, however, placing the said optical elements at the angles substantially different from the said values will degrade the system performance.

In the said embodiments the thickness of the compensating birefringent plate 606 may be about equal or greater than the thickness of the rotating birefringent plate 604 in order to achieve the zero OPD over the range of the rotation angle of the rotating plate.

In the said embodiments the fixed birefringent plate can be placed with its surface perpendicular to the direction of light propagation, or alternatively it can be placed with its surface at a certain angle with respect to the direction of light propagation.

In the said embodiments the optical axis of the rotating birefringent plate can be preferably placed parallel or perpendicular with respect to the axis of the plate rotation. The optical axis of the rotating birefringent plate can also be placed at any other angle with respect to the axis of the plate rotation; however, the said placement of the optical axis at an angle substantially different from parallel or perpendicular orientation will degrade the system performance.

Figure 7:
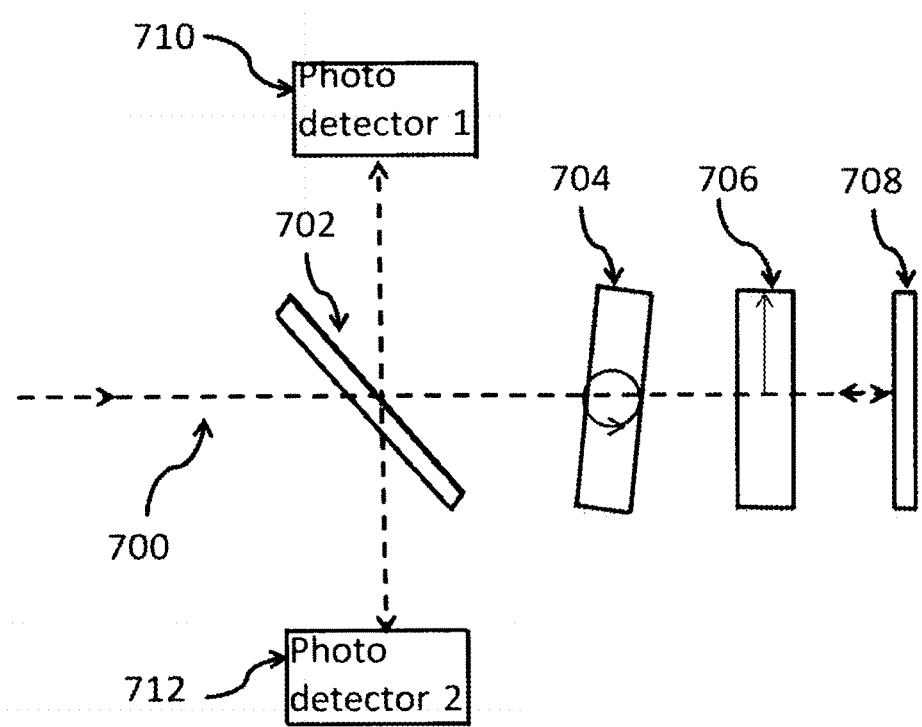
FIG. 7 illustrates another arrangement of birefringent interferometer with a single rotating birefringent plate according to the present invention with the addition of another photodetector for measuring the intensity of the incident beam reflected from the polarizing beamsplitter.

In order to achieve low noise of the spectroscopic measurements in any Fourier Transform spectrometer, the light intensity of the incident beam has to be kept precisely constant, otherwise the variations of the incident beam light intensity will modulate the interferometer photodetector signal and appear as spurious noise in the resulting output spectrum. If the light source is comprised within the spectrometer system, the driving voltage can be precisely controlled by the signal processing and control unit of the system. Alternatively, as illustrated in FIG. 7, if the light source is separate from the system assembly and its intensity cannot be precisely controlled, in some embodiments the intensity of the incident beam can be directly measured by a second photodetector 712 receiving a portion of incoming beam reflected by the same polarizing beamsplitter 702 used for the purpose of polarizing the incoming radiation, and the signal from the first photodetector 712 at the output of the interferometer can be divided in the signal processing unit by the signal of the second photodetector 712 at the input of the interferometer in order to cancel the temporal variations of the intensity of the incident beam.

Figure 8:
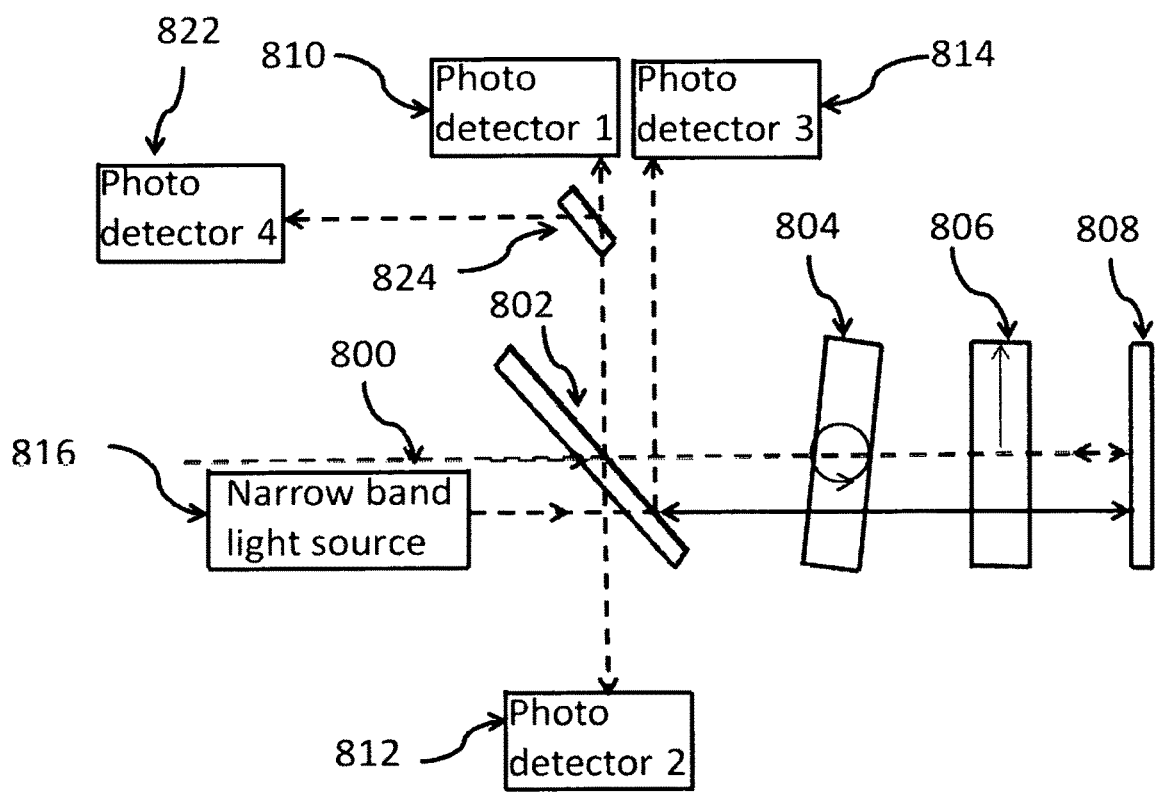
FIG. 8 illustrates another arrangement of birefringent interferometer with a single rotating birefringent plate according to the present invention with the addition of a narrowband or monochromatic reference light source and another photodetector for measuring the intensity of the said monochromatic light source passed through the interferometer.

Also, for a Fourier Transform spectrometer to operate properly, at each moment of time over the period of varying the interferometer OPD the exact value of the OPD needs to be known in order to accurately perform the Fourier Transform of the acquired time domain signal. It is a common practice in the art of Fourier Transform spectroscopy to include a reference monochromatic source in the interferometer arrangement in order to accurately measure the OPD. In a traditional interferometer arrangements known in the prior art the beam from a separate narrow-band or monochromatic light source is passed through a portion of the interferometer aperture separate from the optical aperture used for the incident beam and a separate detector is used to detect the signal from the said monochromatic source modulated by the interferometer instrumental transfer function in order to measure the OPD of the interferometer. A similar arrangement may be used in the birefringent interferometer of the present invention. In another embodiment of the present invention, as illustrated in FIG. 8, a beam from a monochromatic or narrow band light source 816 is directed parallel to the incident light beam at the entrance to the interferometer in order to provide the reference signal to the interferometer. In this arrangement the incident and reference beams are passed through the same clear aperture of the interferometer but occupy separate portions of the aperture and remain spatially separated. The intensity of the reference monochromatic beam is measured by a separate second photodetector 812. In other embodiments more than one monochromatic or narrow band light source can be used at the entrance of the interferometer in order to create a multitude of reference signals for the purpose of achieving an increased the accuracy of wavelength measurements.

In some embodiments, the Fourier Transform of the intensity of the signal measured at the output of the photodetector 610, 710, 810, 910 is performed in order to obtain the spectrum of the incident beam.

In various embodiments, a means to limit the optical FOV of the interferometer may be included. In some embodiments such means may comprise an objective comprising one or more lenses and diaphragms. In some embodiment a photodetector with certain limited photoreceptive area can be placed in the focal plane of a lens or an objective. In other embodiments a diaphragm may be placed in the focal plane of the lens or objective in front of the photodetector.

In some embodiments the polarizing beamsplitter can be made of a separate polarizer plate and a separate beamsplitter plate with the latter placed at the angle with respect to the propagation direction of the incident beam. In other embodiments, the polarizing beamsplitter can be made of a single optical element simultaneously performing the polarizing and beam-splitting functions, such as a wire grid polarizer, placed at the angle with respect to the propagation direction of the incident beam.

The photodetectors used in the said embodiments of the present invention shown in FIGS. 6-10 could include one, a plurality of, or any combination of any photodetectors that have responsivity in the spectral region of interest, for example, a Si photodetector, a Ge photodetector, an InGaAs photodetector, an extended range InGaAs photodetector, an InAs photodetector, a PbS photodetector, an InSb photodetector, a HgCdTe photodetector, a PbSe photodetector, a GeAu photodetector, a CdTe photodetector, HgTe photodetector, a HgCdTe photodetector, a thermistor, a bolometer, a thermocouple, photomupltiplier or a pyroelectric detector.

In other embodiments of the present invention the said photodetectors can be thermoelectrically cooled in order to reduce the detector noise and increase the spectrometer system signal-to-noise ratio.

The spectral region of dispersive spectrometers based on diffraction gratings is limited to a region between a certain lowest wavelength $\lambda_1$ and a wavelength that is equal to $\lambda_2=2*\lambda_1$ because the light of any wavelength higher than $2*\lambda_1$ will overlap with the second diffraction order of the light of the wavelength $\lambda_1$. Fourier Transform spectrometers are immune to the order overlapping problem and their spectral range is limited only by the spectral region of photodetector sensitivity. Therefore, in order to cover an extended spectral range beyond the spectral region of sensitivity of the first photodetector, the system according to the present invention may additionally comprise a forth photodetector 822 that is sensitive to a spectral region different from the spectral region of sensitivity of the first photodetector 824 and a beam-splitting high-pass, low-pass or band-pass filter 824 that passes the spectral region that corresponds to the sensitivity region of the first photodetector and reflects the spectral regions that corresponds to the spectral region of the forth photodetector as illustrated on FIG. 8.

Figure 9:
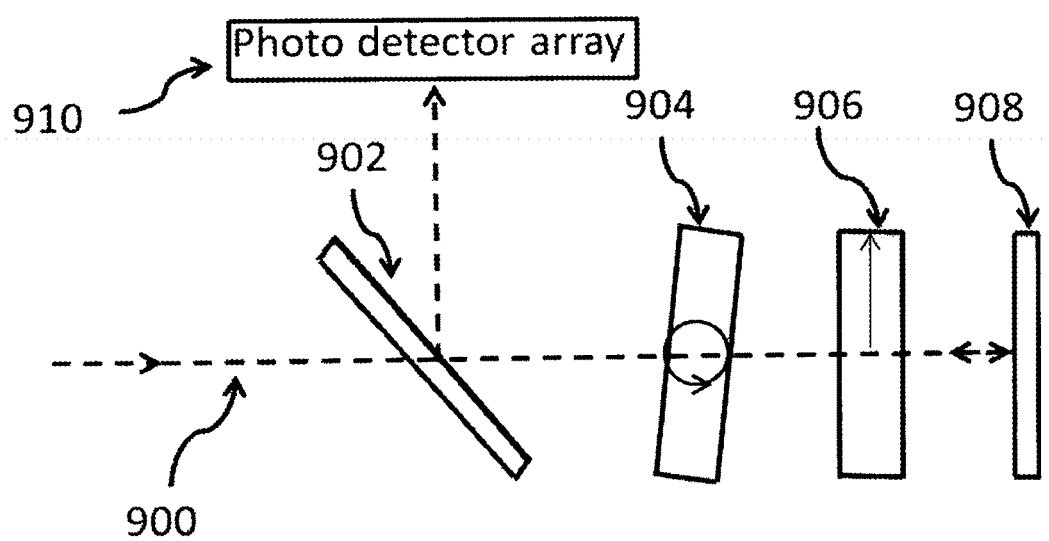
FIG. 9 illustrates another arrangement of birefringent interferometer with a single rotating birefringent plate according to the present invention utilizing a one-dimensional or two-dimensional photodetector array for the purpose of acquiring a hyper-spectral image of the radiation source or illuminated object.

Also, the system according to the present invention can be arranged as a hyper-spectral imaging spectrometer and may comprise a one-dimensional or two-dimensional photodetector array 910 instead of a single photodetector in order to acquire a hyper-spectral image of the radiation source or an illuminated object as illustrated on FIG. 9.

The reflective surface of the mirror and polarizing beamsplitter in the embodiments of the present invention shown in FIGS. 6-10 can be made of any material reflective in the spectral region of interest, for example, Aluminum, Silver, Gold, Platinum, Copper, Nickel, multilayer dielectric or any other optically reflective material.

The polarizing beamsplitter, optical windows, collimating lenses and other transmissive optical elements in the embodiments of the present invention shown in FIGS. 6-10 can be made of any material transparent in the spectral region of interest, for example, any type of Silicon Dioxide based materials such as glass, silica or quartz, or any type of material transparent in the infra-red region such as Sapphire, Zink Selenide, Zink Sulfide, Germanium, Silicon, Calcium Fluoride, Magnesium Fluoride, Sodium Chloride, Potassium Bromide, or any other material that is optically transmissive in the spectral region of interest.

The rotating and fixed birefringent crystal plates in the embodiments of the present invention shown in FIGS. 6-10 can be made of any birefringent crystal material transparent in the spectral region of interest, for example, crystal Quartz ($SiO_2$), Calomel ($Hg_2Cl_2$), Calcite ($CaCO_3$), Rutile ($TiO_2$), Paratellurite ($TeO_2$), Lithium Niobate ($LiNbO_3$), Magnesium Fluoride (MgF2), PbMoO4, Barium Borate ($\alpha$-BBO).

Figure 10:
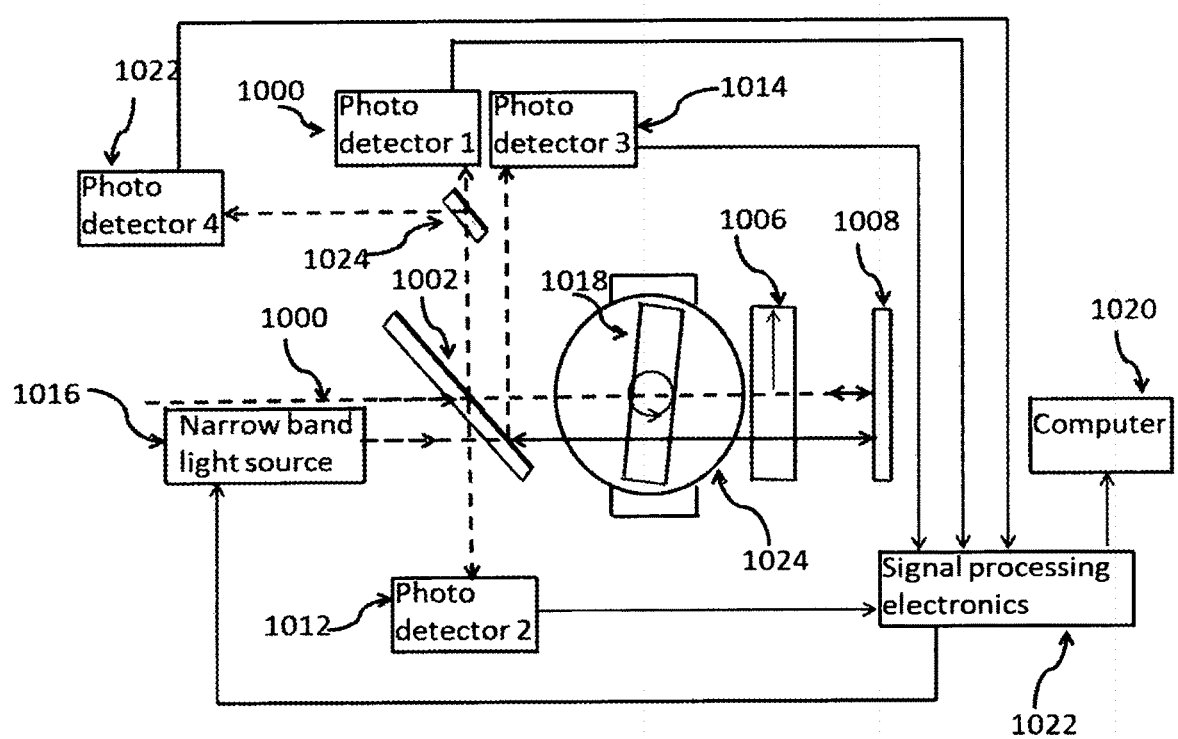
FIG. 10 illustrates a arrangement of Fourier Transform spectrometer based on the birefringent interferometer with a single rotating birefringent plate according to the present invention incorporating a multitude of detectors, an electronic mixed-signal processing unit and a digital signal processing unit.

In various embodiments, as illustrated in FIG. 10, the system may further comprise a precision mechanical mechanism 1024 for the rotation of the rotating birefringent plate 1018. In some embodiments the said mechanism may include a rotary motor, such as stepping motor, DC motor, AC motor or servo motor, combined with mechanical gear mechanism for increasing the rotation positioning accuracy. In other embodiments, the said plate rotating mechanism may include a rotating shaft that holds the rotating crystal coupled with a perpendicularly connected shaft driven by a linear translation stage or an elliptical rotating element. In other embodiments, the said plate rotating mechanism may include a voice coil driving a crystal holder suspended on ball bearings or air bearings.

In various embodiments, as illustrated in FIG. 9, the system may further comprise an mixed-signal (analog and digital) electronic control and signal processing unit 1022 for performing such functions as amplifying the signals from the photodetectors 1010, 1012, 1014, controlling the mechanical plate rotating mechanism 1024, supplying the driving current for the narrow-band or monochromatic light source 1016, measuring ambient temperature, supply voltage and other parameters, providing necessary supply voltages for electronic components, performing analog-to-digital conversion and certain digital signal processing of the photodetector signals, communicating through a wired interface or wirelessly with the digital data processing unit 1020. The system may also comprise a digital data processing unit 1020 that may include a computer, a cellular phone or a cloud processing service for further digital data processing in order to retrieve the spectrum of incoming radiation from the interferometer interferogram and to interact with the user or other equipment or control units. In some embodiments, the Fourier Transform of the interferometer detector signal may be performed by a firmware algorithm in the digital signal processor or microcontroller included in the signal processing unit 1022. In other embodiments, the Fourier Transform of the interferometer detector signal may be performed by a software algorithm in the digital data processing unit 1020 such as a computer, a cellular phone or a cloud processing service that is connected through a wired interface or wirelessly with the signal processing unit 1022.
Variations and Implementations As will be appreciated by one skilled in the art, aspects of the present invention may be embodied in various manners—e.g. as a method or a system. Accordingly, aspects of the present invention may take the form of an entirely hardware embodiment or a combination of hardware and software embodiment (including optical and electronic assembly, firmware, software, etc.) that may all generally be referred to herein as a "module" or "system." Some functions described in this invention disclosure may be implemented as an algorithm executed by one or more processing units, e.g. one or more embedded microcontrollers, or microprocessors, or one or more computers, cellular phones or cloud computing system. In various embodiments, different steps and portions of the steps of each of the examples described herein may be performed by different processing units. Furthermore, some aspects of the present invention may take the form of a computer program product embodied in one or more computer readable medium(s), having computer readable program code embodied, e.g., stored, thereon. In various embodiments, such a computer program may, for example, be downloaded (updated) to the existing devices and systems or be stored upon manufacturing of these devices and systems.

Other electronic functions described in this invention may be implemented as various analog or digital integrated circuits such as operational or instrumentation amplifiers, power converters and LDOs, analog-to-digital and digital-to-analog converters, etc.

Other optical functions described in this invention may be implemented as various optical elements such as diaphragms, aperture stops, lenses, mirrors, prisms, reflectors, fiber optic cables and connectors, etc.

In the discussions of the embodiments above, various components can readily be replaced, substituted, or otherwise modified in order to accommodate particular circuitry needs. Moreover, it should be noted that the use of complementary optical components, electronic devices, hardware, software, etc. offer an equally viable option for implementing the teachings of the present disclosure.

Additional optical, electronic, firmware and software functions not described in the present invention disclosure may be added to include a variety of additional features required by specific applications.

It is also imperative to note that all of the specifications, dimensions, and relationships outlined herein have only been offered for purposes of example and teaching only. Such information may be varied considerably without departing from the spirit of the present disclosure, or the scope of the appended claims. The description and drawings are, accordingly, to be regarded in an illustrative rather than in a restrictive sense.

In certain contexts, the features discussed herein can be applicable to medical systems, scientific instrumentation, industrial process control, patient monitoring, medical instrumentation. In yet other example scenarios, the teachings of the present disclosure can be applicable in the industrial markets that include process control systems that help drive productivity, energy efficiency, and reliability.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this disclosure. In certain cases, it may be easier to describe one or more of the functionalities of a given set of flows by only referencing a limited number of elements. It should be appreciated that the arrangements of the FIGURES and its teachings are readily scalable and can accommodate a large number of components, as well as more complicated/sophisticated arrangements and configurations. Accordingly, the examples provided should not limit the scope or inhibit the broad teachings of the optical elements and electrical circuits as potentially applied to a large number of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method described herein and specifics in the examples may be used anywhere in one or more embodiments.

The invention claimed is:

1. A birefringent interferometer comprising:
   a beamsplitting polarizer;
   a reflective mirror;
   at least one rotating birefringent crystal plate and at least one fixed birefringent crystal plate placed between the said beamsplitting polarizer and the said mirror.

2. The birefringent interferometer of claim 1 wherein the optical axis of the fixed and rotating birefringent plates are arranged about perpendicular to each other and about perpendicular to the direction of the beam propagation.

3. The birefringent interferometer of claim 1 wherein the optical axis of the fixed and rotating birefringent plates are arranged at an angle of about 45 degrees with respect to the polarization direction of the polarizing beamsplitter.

4. The birefringent interferometer of claim 1 wherein the said beamsplitting polarizer is a wire grid polarizer.

5. The birefringent interferometer of claim 1 wherein the said beamsplitting polarizer is a combination of a beamsplitter and a dichroic or wire grid polarizer.

6. The birefringent interferometer of claim 1 further comprising a photodetector configured to receive the beam of light after the said beam passes through the said birefringent interferometer and to convert the intensity of the received light into electrical signal.

7. The birefringent interferometer of claim 6 further comprising a beam-splitting high-pass, low-pass or band-pass filter placed between the polarizing beamsplitter and the first photodetector and further comprising another photodetector with a spectral region of sensitivity different from the sensitivity spectral region of the first photodetector and configured to receive at least a portion of the incident beam of light after the said beam passes through the said birefringent interferometer and to convert the intensity of the received portion of the incident light into electrical signal.

8. The birefringent interferometer of claim 6 further comprising another photodetector configured to receive at least a portion of the incident beam of light before the said beam passes through the said birefringent interferometer and to convert the intensity of the received portion of the incident light into electrical signal.

9. The birefringent interferometer of claim 1 further comprising a one-dimensional or two-dimensional photodetector array configured to receive the beam of light after the said beam passes through the said birefringent interferometer and to convert the intensity of the received light into one-dimensional or two-dimensional array of electrical signals.

10. The birefringent interferometer of claim 1 further comprising a broadband light source configured to direct the beam of light into the said interferometer.

11. The birefringent interferometer of claim 6 further comprising one or more monochromatic or narrow spectral band sources and another photodetector for measuring the intensity of the said monochromatic or narrow spectral band sources passed through an optical aperture of the interferometer.

12. The birefringent interferometer of claim 1 further comprising an electronic signal processing unit.

13. The birefringent interferometer of claim 12 wherein the electronic unit further contains a computer, an embedded processor, a cellular phone, a cloud computing service or a digital signal processing unit to perform a digital signal processing of the interferometer detector signal.

14. The birefringent interferometer of claim 6 further comprising a signal processor in communication with the electrical signal of the interferometer's photodetector wherein the signal processor performs Fourier transform of the photodetector electrical signal to obtain a spectrum of the received light.

15. The birefringent interferometer of claim 9 further comprising a signal processor in communication with the electrical signal of the interferometer's one-dimensional or two-dimensional photodetector array wherein the signal processor performs Fourier transform of the electrical signal from each photodetector of the said one-dimensional or two-dimensional photodetector array to obtain a one-dimensional or two-dimensional array of spectra of the received light.

16. A method of performing Fourier Transform spectrometry of an incident light comprising:
extracting a certain polarization of an input light by means of polarizing beamsplitter;
splitting a polarized beam of light into ordinary and extraordinary components by means of directing the polarized beam of light through at least two birefringent crystal plates;
varying the effective optical path difference between ordinary and extraordinary components by means of mechanically rotating one of the said birefringent plates;
combining the ordinary and extraordinary components of the beam by means of the same said polarizing beamsplitter causing ordinary and extraordinary components to interfere with each other;
measuring the intensity of the combined light over time; and
performing Fourier Transform of the intensity measurements in order to determine spectral properties of the incident light.

17. The method of performing Fourier Transform spectrometry on an incident light of claim 16 further comprising:
Illuminating an entrance aperture of the said optical system with the light from one or more a monochromatic or narrow spectral band sources;
measuring the intensity of the light from the said monochromatic or narrow spectral band sources passed through the said optical system over time during the periods of rotation of the said crystal plate in order to measure the optical path difference between the ordinary and extraordinary components of radiation of the said monochromatic or narrow spectral band sources;
performing Fourier Transform of the intensity measurements in order to determine spectral properties of the incident light using the intensity measurements of the said monochromatic or narrow spectral band sources as reference signals.

18. The method of performing Fourier Transform hyperspectral imaging of claim 16 wherein:
the intensity of light passed through the said optical system over time during the periods of rotation of the said crystal plate is measured by a one-dimensional or two-dimensional array of photodetectors and Fourier Transform is applied to the multitude of the photodetector array signals in order to obtain a hyper-spectral image of the incident light.

19. The method of performing Fourier Transform hyperspectral imaging of claim 17 wherein:
the intensity of light passed through the said optical system over time during the periods of rotation of the said crystal plate is measured by a one-dimensional or two-dimensional array of photodetectors and Fourier Transform is applied to the multitude of the photodetector array signals in order to obtain a hyper-spectral image of the incident light.

* * * * *